Oct. 23, 1934. T. W. RIEKE Re. 19,351

FITTING FOR CONTAINERS

Original Filed April 18, 1927

INVENTOR.
THEODORE W. RIEKE.
BY Lockwood Goldsmith & Gale
ATTORNEYS.

Reissued Oct. 23, 1934 Re. 19,351

UNITED STATES PATENT OFFICE 19,351

FITTING FOR CONTAINERS

Theodore W. Rieke, Auburn, Ind., assignor to Rieke Metal Products Corporation, a corporation of Indiana Original No. 1,748,923, dated February 25, 1930, Serial No. 184,562, April 18, 1927. Application for reissue March 17, 1934, Serial No. 716,204

REISSUED

9 Claims. (Cl. 220—39)

This invention relates to improvements in fittings for containers, for example, as barrels made of sheet metal, and the object of the improvement is to construct and apply a bung ring to the sheet metal head or wall of a container so that it will be held from turning, and to apply an anchor member in conjunction with the bung ring to the metallic head or wall of the container, whereby the bung, for closing the container, may be secured from being turned by applying a sealing device of ordinary structure to the bung and said anchor member. Another object of the improvement is to afford an anchoring device in conjunction with a bung ring fixture so formed as to be sightly, and which will not obstruct operations in applying and removing the bung from the fixture or in handling the container. A further object is to apply to the bung fixture of a container an anchor member for connection of a sealing device to secure the bung from turning, which member may be made and applied economically. The invention contemplates the provision of an efficient sealing device for the bung of a container, whereby the bung may be secured by a seal in approximately the position it reaches when completely closed, and thus obviate the necessity of "lacing" of the seal wires.

These objects are accomplished by the construction illustrated in the accompanying drawing, in which:—

The characters appearing in the description refer to parts shown in the drawing and designated thereon by corresponding characters.

Figure 1:
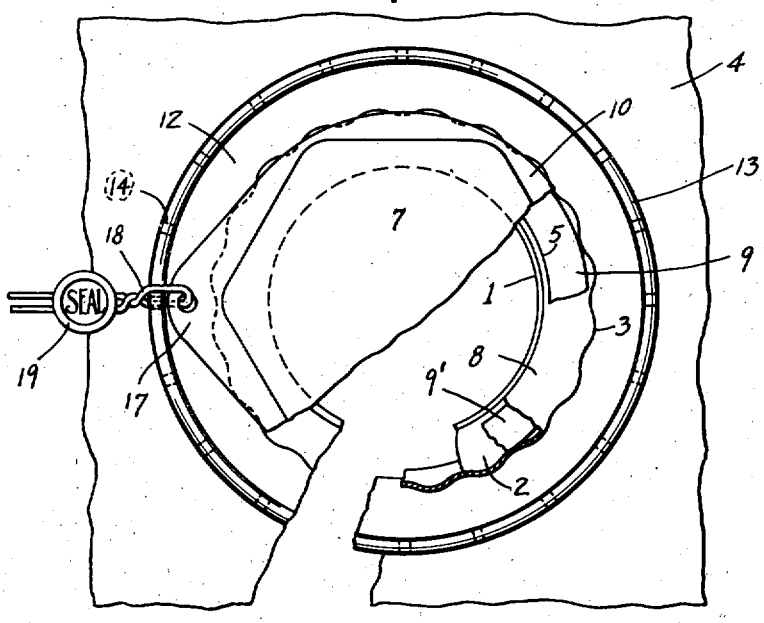
Fig. 1 is a plan view of a construction embodying the invention, parts being broken away.
Figure 2:
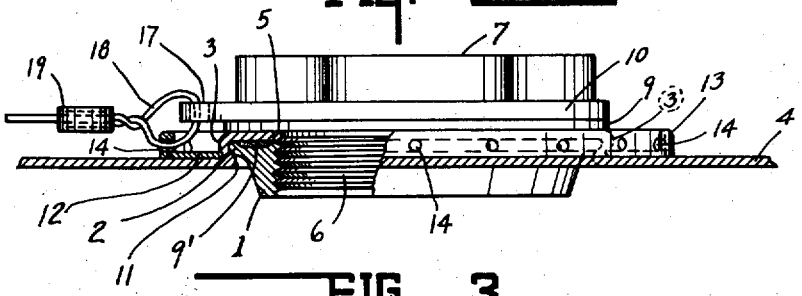
Fig. 2 is an elevation projected from Fig. 1, a portion being in cross-section.

The bung fixture comprises an internally threaded ring 1 having an external flange 2 the outer perimeter of which is escalloped and is enveloped in an embossment 3 made in the metallic sheet 4 that forms the head or wall of a container. The embossment has an opening 5 therein that is concentric with the bung ring 1 and through which the threaded end 6 of the bung 7 extends into said ring. Also, the outer perimeter of said embossment is pressed into conformity with the escalloped flange 2 of the bung ring, by means of suitable dies so that turning of the ring in said embossment is thereby prevented. The top of the embossment overlaps the top of the bung ring 1 and forms an annular seat 8, there being a gasket 9 interposed between said seat and the flange 10 on the bung. The embossment 3 has also an inwardly extending annular crimp 11 that extends beneath the flange 2 of the bung ring, and in which crimp is secured the inner perimeter of an anchor ring 12 that is superimposed upon the sheet 4 and encompasses said embossment.

Figure 3:
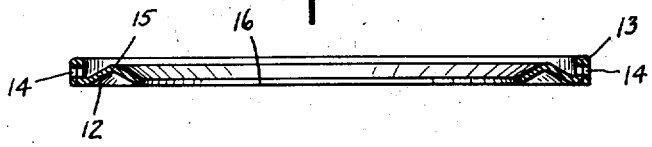
Fig. 3 is a cross section of the anchor member as it is formed preliminary to being applied to the bung fixture.

The anchor ring 12 has a bead 13 forming its outer perimeter, which bead has a series of perforations 14 made therein, and the internal flange 15 of said ring is initially arched, as shown in Fig. 3, so that the opening 16 of the ring is of such diameter as will admit of the ring being placed over the embossment 3 onto the sheet 4. The ring is applied to said embossment preliminary to the formation of the crimp 11 therein, and the flange 15 of the ring is flattened simultaneously with the operation in which the crimp 11 is formed and the embossment is compressed about the bung ring. The flattening of the flange 15 causes the inner perimeter thereof to bear forcefully against the escalloped outer wall of the embossment and partake of the irregular formation of the outer wall of the embossment. In this manner the anchor ring is fixedly secured in the crimp and is prevented from having turning movement.

The bung ring and the anchor ring are held fixed in connection with the embossment, and relative turning movement thereof is prevented. The bung 7 is provided with a perforated laterally extending lug 17, and a wire 18 is introduced through the perforated lug and through one of the openings 14 in the bead 13 of the anchor ring, so that when a seal 19 is applied in the customary manner to the ends of the wire, the bung will be secured from being turned.

In utilizing the invention the bung is screwed into the bung ring and tightened therein by forcibly turning the bung. The seal wire is then introduced through the perforated lug 17 and one of openings 14 in the bead 13 that is nearest the outer end of the lug, after which the seal is applied in the customary manner. As there are numerous perforations in the bead, and as the bead completely encompasses the path of the perforated lug as the bung is turned in the ring, the seal wire may be applied so as to make a short coupling therewith between the bead and the lug. In this manner the practice of lacing the wire between the bung and more or less remote anchorage, such as ordinarily provided, is obviated. The short coupling of the seal wire between the lug and bead prevents loosening of the bung without destroying the seal.

As a means to augment the tightness of the fit between the bung ring and the embossment a gasket 9' may be inserted between the top of the ring and the overlying portion of the embossment at the time of establishing the ring in the embossment. While the inner perimeter of the flange 15 of the anchor ring is described as partaking of the irregular formation of the wall of the embossment, if preferred, the inner perimeter of said flange may be initially escalloped and bent upwardly at an angle to facilitate applying the ring on the embossment and more firmly attaching the ring in connection with the embossment.

What I claim is:

1. A fitting for a sheet metal container, an annular embossment having a central opening therein and an escalloped outer perimeter, formed in the head or wall of the container; an internally threaded bung ring having an external flange, the outer perimeter of which flange is escalloped and has interlocking relation with the escalloped perimeter of said embossment; an anchor member consisting of a metallic ring having a perforated annular bead and a flange extending inwardly therefrom and having interlocking relation with said embossment, said embossment having permanent clamping relation with the inner periphery of the anchor member and the external flange of said bung ring; a bung having a perforated lug in threaded relation with the bung ring; and a seal for securing said lug and anchor member whereby said bung is prevented from being turned.

2. In combination with a sheet metal container, an annular embossment formed in the head or wall of said container, and having an aperture therein concentric therewith; a bung ring secured in said embossment; an anchor member encompassing said embossment, said bung ring and anchor member having interlocking relation with said embossment and clamping the wall of said embossment therebetween whereby turning movement of said ring and member relative to said embossment is prevented; a bung extending through said aperture and having threaded relation with said bung ring; and a sealing device for connecting the bung and the anchor member operable to prevent turning movement of the bung.

3. In combination with the wall of a sheet metal container, an apertured embossment formed in said wall; a bung ring having a flange positioned in said embossment; and an anchor member encompassing said embossment, said ring and anchor member having interlocking relation with said embossment and clamping the wall of said embossment therebetween whereby turning movement of said ring and member is prevented.

4. In combination with the wall of a sheet metal container, an apertured embossment in said wall; a bung ring having a flange interlocked in said embossment; and an annular anchor member encompassing said embossment, which member has an outer marginal perforated bead and an inwardly extending flange, which flange is initially arched and positioned in place about said embossment and subsequently flattened whereby said flange is locked in place upon said embossment.

5. In combination with the wall of a sheet metal container, an apertured embossment formed in said wall, a bung ring having a flange positioned in said embossment, said ring having an external non-circular periphery and an internal thread, and an apertured anchor member encompassing said embossment and having a non-circular inner periphery when finally mounted, said ring and anchor member having an interlocking relation with said embossment and clamping the wall of said embossment therebetween whereby turning movement of said ring and member relative to the embossment is prevented.

6. In combination with the wall of a sheet metal container, an apertured embossment formed in said wall, a bung ring having a flange positioned in said embossment, said ring having an external non-circular periphery and an internal thread, an apertured anchor member encompassing said embossment and having a non-circular inner periphery when finally mounted, said ring and anchor member having an interlocking relation with said embossment and clamping the wall of said embossment therebetween whereby turning movement of said ring and member relative to the embossment is prevented, said ring including an outwardly and laterally projecting portion including an aperture, a bung having a laterally projecting portion including an aperture, and a seal for securing said bung and anchor member whereby said bung is prevented from being turned.

7. A device as defined by claim 6, characterized by the laterally projecting portion of the ring being of peripheral character and including a plurality of peripherally spaced apertures for selective association of the seal therewith.

8. A device as defined by claim 6, characterized by the addition of a gasket positioned between the laterally projecting portion of the plug and the ring and bearing on the embossment between the plug and the ring.

9. A device as defined by claim 6, characterized by the addition of a gasket positioned between the laterally projecting portion of the plug and the ring and bearing on the embossment between the plug and the ring, said laterally projecting portion of the ring including a plurality of peripherally spaced apertures for selective association with the seal therewith.

THEODORE W. RIEKE.